United States Patent [19]

Franks, Jr.

[11] Patent Number: 5,033,971
[45] Date of Patent: Jul. 23, 1991

[54] GROUNDING SYSTEM AND STUD

[76] Inventor: George J. Franks, Jr., 664 Thompson Cir., Inverness, Ill. 60067

[21] Appl. No.: 432,951

[22] Filed: Nov. 7, 1989

Related U.S. Application Data

[63] Continuation-in-part of Ser. No. 204,397, Jun. 9, 1988, Pat. No. 4,993,960, which is a continuation-in-part of Ser. No. 116,899, Nov. 3, 1989, Pat. No. 4,828,504.

[51] Int. Cl.⁵ .................................................. H01R 4/66
[52] U.S. Cl. ........................................ 439/92; 439/803
[58] Field of Search ................ 439/92, 95, 97, 100, 439/803, 810-812; 174/38, 57

[56] References Cited

U.S. PATENT DOCUMENTS

| 3,164,668 | 1/1965 | Skubal | 174/38 |
| 3,614,538 | 10/1971 | Nickola | 174/38 X |
| 4,076,198 | 2/1978 | Garrett | 174/38 X |
| 4,887,187 | 12/1989 | Nickola | 174/51 X |
| 4,904,193 | 2/1990 | Graves | 439/803 X |

FOREIGN PATENT DOCUMENTS 1159264 7/1969 United Kingdom ................ 174/51

Primary Examiner—Eugene F. Desmond
Attorney, Agent, or Firm—Jenner & Block

[57] ABSTRACT

A system for common grounding of a telephone system and an electric power system is provided. A stud is provided that is integrally secured to the outer surface of an electrical meter box without penetrating the inside of the meter box. The stud is connected through a grounding connection to the telephone system. The stud has a bore formed therein for receiving an electrical conductor, a threaded opening extending into the bore and a securing screw located within the threaded opening for securing the electrical conductor to the stud.

23 Claims, 1 Drawing Sheet

GROUNDING SYSTEM AND STUD

This is a continuation-in-part of application Ser. No. 204,397, filed June 9, 1988, now U.S. Pat. No. 4,993,960 which is itself a continuation-in-part of application Ser. No. 116,899, filed Nov. 3, 1987, which issued May 9, 1989 as U.S. Pat. No. 4,828,504.

FIELD OF THE INVENTION

The present invention relates to a grounding system and a grounding stud for electrically grounding conductors. In a particular embodiment, a system including a stud for grounding a telephone system to an electrical power system is provided. The grounding system utilizes the stud and common parts of both the telephone system and the electrical power system, eliminating the necessity for multiple and separate grounding mechanisms for each type of system.

BACKGROUND OF THE INVENTION

In providing electrical power service and telephone service to a building, separate electrical grounding systems are typically provided for each service. For example, an electrical utility box containing a meter will have a riser or ground level connector which supplies power to the building. An elongated ground rod is sunk into the ground and connected through heavy gauge wire to the electrical utility box for grounding purposes.

Adjacent to the electric utility box may be the telephone system interface box. The telephone system interface box is typically connected through a riser to the telephone line from the telephone company. Again, a separate elongated ground rod will be sunk, typically within several feet of the power ground rod, and run through wire of lower gauge to the telephone system interface box for grounding purposes.

To reduce the potential difference between the telephone wiring and the electrical system, it is then necessary to connect a jumper wire or bond between the telephone system ground rod and the electrical power system ground rod to prevent differences in potential which could result in uncontrolled arcing between the telephone wiring and the electrical system in the event of lightning or accidental contact with the telephone line, for example.

While the foregoing procedures provide adequate grounding of the power system and telephone system and reduce potential differences therebetween, the cost and complexity is high in that two pairs of grounding rods, clamps, grounding wires as well as the ground jumper wire or bond are required. All these various elements require installation, in addition to the cost and complexity of the hardware itself.

A single grounding system would be desirable. The telephone ground rod is typically of much smaller diameter and length than the power ground rod and could not adequately handle the more substantial requirements for the power system. The power ground rod is buried and he available metal conductors, such as the utility meter box, are painted and/or treated with a coating to prevent rusting and provide for long term life. Further, drilling a hole through the electric utility box is highly undesirable in that entry of foreign matter and moisture into the electric utility box is then allowed. Any system must recognize the realities of adverse conditions including dirt, paint, and other non-conducting surfaces, as well as corrosion, which must be addressed in order to insure a suitable mechanical and electrical connection which will withstand the rigors of an outdoor environment.

Various devices have been known in the art to provide an electrical ground. However, it has not been apparent that any of the known devices could overcome the problems inherent in the current system of providing separate grounding systems for the electrical power system and the telephone system.

SUMMARY OF THE INVENTION

In accordance with the present invention, a novel system and stud are disclosed which provide a common system for grounding the telephone system and the electrical power system. A novel stud is connected to the electrical meter box of the power system with securing structure for integrally and permanently attaching the stud to the outer surface of the utility box without penetrating the inside of the utility box. Problems with moisture penetration and various contaminants are avoided since the inside of the box is not penetrated and the integrity of the box is not otherwise breached. This novel stud is then connected through a ground wire to the telephone system interface box in order to provide the ground connection for the telephone system, eliminating the need for a separate telephone system ground rod, as well as the ground wire bond heretofore provided between the telephone system ground rod and the electrical power system ground rod.

The simplicity of the device and its ease of attachment provide for an effective electrical ground for the telephone system that can be formed by persons having no special training. Thus, even consumers of the telephone system, when installing a telephone interface box, can accomplish an adequate ground without the need for special tools. Further, the burying of the telephone system grounding rod is no longer necessary. Labor normally associated with establishing an adequate telephone system ground is generally eliminated.

The novel stud which is utilized for this purpose has utility for any metal box enclosure to which an electrical conductor is to be both mechanically and electrically secured for grounding purposes or other reasons for forming an electrical connection to the utility box itself. The electrical connection is accomplished by a securing mechanism which does not penetrate through the utility box and thus does not compromise its integrity and ability to withstand moisture and contaminants.

To eliminate the need to mount the telephone interface box at an entirely different location, such as at the side of the building, the telephone interface box is mounted to utility box through attachment to a bracket. Specifically, the interface box is secured to a plate, the plate being then attached to the bracket. The bracket is also secured to the utility box with securing means for integrally and permanently attaching the bracket to the outer surface of the utility box without penetrating the inside of the utility box.

One object of this invention is to provide a system for grounding a telephone system and electrical power system through a single ground rod and ground wire which serves the dual purpose of grounding both systems without comprising the integrity of either system.

Another object of this invention is to provide a system for grounding the telephone and power systems through a stud secured to an outer surface of the electric utility box for forming an adequate electrical and mechanical connection between the telephone and power systems without penetrating through the utility box and compromising its integrity.

It is a further object of this invention to provide a stud which is connectable to a metal box enclosure without penetrating the inside of the box.

It is a further object of this invention to provide a bracket which is connectable to a utility box to which the telephone interface box is mounted.

Other objects and advantages of the invention will become apparent upon the following detailed description with reference to the drawings, like reference numerals referring to like parts.

DESCRIPTION OF THE PREFERRED EMBODIMENT

Figure 1:
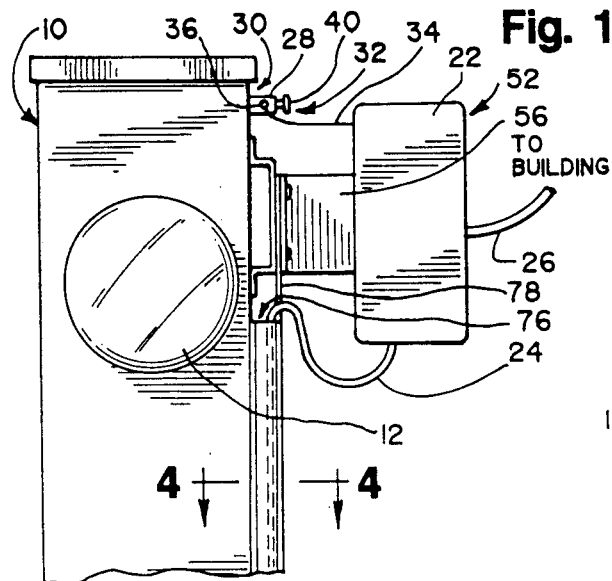
FIG. 1 is a front partial view of one embodiment of the invention.
Figure 3:
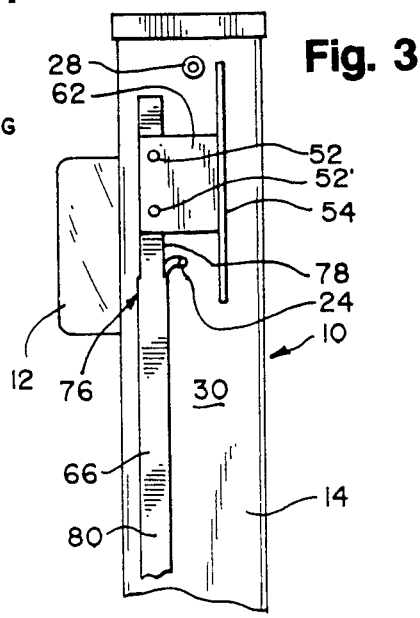
FIG. 3 is an elevated partial side view of the invention shown in FIG. 1 without the telephone interface box.

Electrical power and telephone service are typically connected through overhead risers or buried underground cables to interface equipment located on the outside of a building. FIG. 1 illustrates some of the interface equipment mounted to a side of the building including an electrical utility box 10 of rectangular shape which mounts a power meter 12 for determining the amount of power consumption being utilized within the building. The box may be an elongated structure 14 extending downwardly and partially buried into the ground G through which the power cables P would be led from an underground feeder system, or alternatively, from a hollow conduit or riser extending upwardly in the case of overhead service (not illustrated).

Whether the utility box has an underground feed or an overhead feed, the metal box itself must be electrically connected to ground G through a suitable grounding system. For example, structure 14 holds a large size grounding wire 16 which is connected through a clamp 18 to an elongated grounding rod 20 sunk into the ground G. Typically, this grounding rod 20 may be six feet or more in length and is located within three feet or other close proximity to the base of the building. Ground wire 16 is then connected to a grounding bracket (not illustrated) within the electric utility box in a known manner.

Located closely adjacent the electric utility box 10 will be a telephone system interface box which is mounted to the wall of the building. The telephone interface box 22 is connected through the underground feed 24, or alternatively, overhead riser, to the external telephone company system (not illustrated). The telephone lines are connected through interface box 22 to the building phone system through conventional wiring 26. Telephone interface box 22 must also be grounded suitably to the same ground G in a manner which will not cause a potential difference between the telephone system and the electrical power system in the event that lightning or accidental electrical contact should be made to the telephone wires themselves.

The system described above is conventional and may take a wide variety of known configurations. Previously, the telephone interface box 22 has been coupled through a ground wire to a separate ground rod (not illustrated) located a short distance away from the power ground rod. This requires a separate ground rod and cable to the telephone interface box 22, and also a bond or jumper wire (not illustrated) connected between the pair of grounds rods in order to prevent any potential difference therebetween. In accordance with the present invention, the complexity of this prior system and the labor necessary to install it are eliminated by a system which can be installed by persons without specialized training and without comprising the integrity of either the electrical power system or the telephone system.

Figure 2:
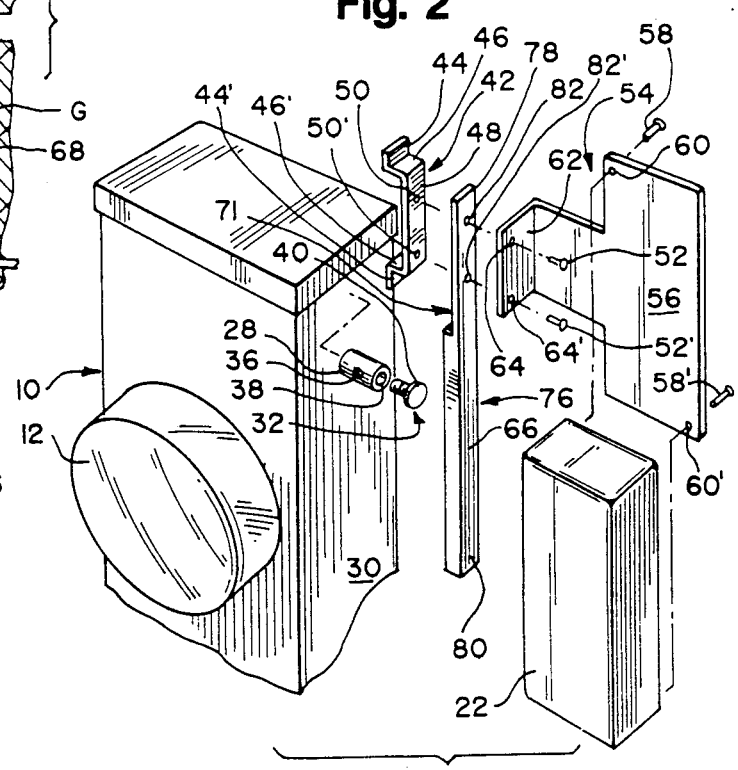
FIG. 2 is a perspective, exploded view of the invention shown in FIG. 1.

As illustrated generally in the Figures, a stud 28 is secured to an outer surface 30 of the utility box 10. Stud 28 is constructed from any electrically conductive material, preferably brass, copper, steel or the like. Stud 28 can have any suitable shape, such as the generally cylindrical shape depicted in the FIG. 2.

Stud 28 is mechanically and electrically secured to utility box 14 by any known structure, material or method. However, it is important that the means used to attach stud 28 to outer surface 30 of utility box 10 not penetrate the inside of utility box 10. Stud 28 is preferably integrally and permanently mechanically and electrically secured to the outer surface 30 of the utility box 10 by welding or brazing.

Stud 28 further includes a ground wire securing mechanism 32 in the form of a further clamping device for electrically and mechanically securing a ground wire 34 to stud 28. Through wire 34, stud 28 is therefore electrically and mechanically secured to the telephone interface box 22. Ground wire 34 is connected to telephone interface box 22. Ground wire 34 is connected in a known manner. Ground wire 34 is typically AWG size 6 through 12, inclusive.

A first bore 36 is formed in stud 28 to accept ground wire 34. A second bore 38 is formed in stud 28 and extends to first bore 36. Second bore 38 is preferably formed substantially perpendicular to first bore 36. Second bore 38 is threaded to accommodate ground wire securing screw 40, which is moveable through second bore 38 and into first bore 36. Securing screw 40 functions to secure ground wire 34 within first bore 36 to stud 28 to establish a mechanical and electrical connection therebetween.

Stud 28 provides a mechanical connection to utility box 10, and also the necessary electrical connection for grounding the telephone system to utility box 10 which in turn is grounded through ground wire 16 to ground rod 20. A separate telephone system ground rod and clamp, and a ground wire bond are avoided since the telephone system is electrically connected to the power system ground. While stud 28 is illustrated as located on the right-hand, side surface of utility box 10 in FIG. 1, alternate placements are possible at any surface of a utility box where stud 28 is mechanically and electrically securable.

While the system is illustrated in connection with an electrical utility box, it will be apparent that novel stud 28 can be used anytime an electrical and mechanical connection is to be made to a metal box enclosure. The electrical connection can be for purposes of grounding or for any other purpose for which an electrical connection is to be made to a metal, electrically conductive, box enclosure.

Further, telephone interface box 22 or any other suitable component of the telephone system is capable of being mounted directly to electrical utility box 10. Specifically, a telephone interface mounting bracket 42 is mechanically and electrically attached to the box by any conventional means, such as welding or brazing, without penetrating through the utility box 10 and without therefore compromising its integrity. Bracket 42 has feet 44 and 44', which are secured to surface 30. Legs 46 and 46', extend outward from feet 44 and 44'. Legs 46 and 46, support a platform 48, extending therebetween. Platform 48 has two holes 50 and 50' to accept bolts 52 and 52', respectively. A plate 54 is secured to platform 48. Plate 54 is secured to platform 48 with the bolts 52 and 52, through holes 64 and 64'. Plate 54 has a mounting portion 56 to which telephone interface box 22 is secured with bolts 58 and 58' through holes 60 and 60', respectively. An attachment portion 62 of plate 54 is also secured to platform 48 with bolts 52 and 52' through holes 64 and 64, The securing of at least one component of the telephone system to utility box 10, such as telephone interface box 22, eliminates the complexity of prior systems and the labor necessary to install it by eliminating the need to mount interface box 22 to an entirely different surface, such as the wall of the building. Further, an additional ground connection is achieved between telephone interface box 22 and utility box 14 through the mechanical and electrical through plate 54 and bracket 42.

Figure 4:
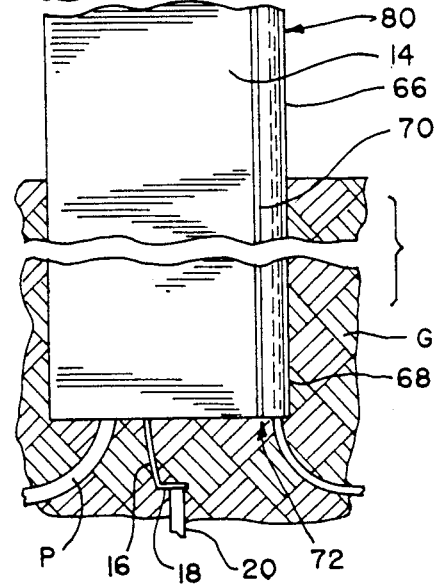
FIG. 4 is a sectional view along the lines 4—4 in FIG. 1, illustrating the conduit and power line.

Underground telephone feed 24 is protected from the environment along at least a part of its length above the ground with conduit 66. Conduit 66, as illustrated in FIG. 4, is of substantially rectangular cross-sectional area, although conduit 66 can have any suitable cross-sectional area. Conduit 66 is constructed of any suitable material, such as hard plastic or metal, preferably polyvinyl chloride. As illustrated in FIG. 1, lower end 68 of conduit 66 is sunk into the ground along at least a part of the length of the outer surface 30. Tape 70, or alternatively, any suitable means, can be used to hold lower end 68 in position. Underground feed 24 is fed through the lower opening 72 of conduit 66, through at least a portion of its length and out of conduit 66 through upper opening 74.

Conduit 66 has an upper end 76. Upper end 76 also has an extension 78, which is essentially a side wall 80 of conduit 66 that has a longer length than the other side walls of conduit 66. Extension 78 is held between platform 48 and attachment portion 62 by bolts 52 and 52' which pass through holes 82 and 82', respectively. The combination of tape 70 and extension 78 effectively hold conduit 66 in place against structure 14.

By this arrangement, and if conduit 66 is construed as an electrically conductive material, a third ground connection is achieved for the telephone interface box 22 since lower end 68 of conduit 66 is sunk into the ground and upper end 72 of conduit 64 is mechanically and electrically connected to interface box 22 through plate 54.

While the invention is described in connection with preferred embodiments, it will be understood that it is not intended to limit the invention to these embodiments. On the contrary, it is intended to cover all alternatives, modifications and equivalents as may be included in the spirit and scope of the invention as described by the appended claims.

What is claimed is:

1. A system for grounding a telephone system and an electrical power system, comprising:
   an electric utility box for the electric power system;
   a ground mechanism;
   a first electrical conductor connecting the ground mechanism to the utility box for electrically grounding the utility box;
   a stud welded to the outer surface of the utility box; and
   a second electrical conductor for electrically connecting the stud to a ground connection for the telephone system whereby the ground mechanism serves the dual purpose of grounding the telephone system and the utility box.

2. The system of claim 1 wherein the second electrical conductor is a grounding wire, and wherein the stud includes a bore formed therein for receiving the grounding wire, a threaded opening in the stud extending to the bore, and a securing screw moveable within the threaded opening for securing the grounding wire in the bore.

3. The system of claim 1 wherein the stud is secured to the utility box without penetrating the inside of the box.

4. The system of claim 1 further comprising a bracket secured to the utility box on which at least one component of the telephone system is mounted.

5. The system of claim 4 wherein the bracket is welded to the outer surface of the utility box.

6. The system of claim 5 wherein a telephone system interface component is mounted to the bracket.

7. The system of claim 4 further comprising a plate mounted to the bracket, with the telephone system component mounted to the plate.

8. A system for grounding an electrical conductor, comprising:
   a metal utility box for the electrical power system;
   a ground mechanism;
   a first electrical conductor connecting the ground mechanism to the utility box for electrically grounding the utility box;
   a stud integrally attached to the outer surface of the metal box for mechanical and electrical connection of a second electrical conductor to the metal box, said stud having;
   a bore formed therein for receiving the second electrical conductor;
   a threaded opening in the stud extending into the bore; and
   a securing screw moveable within the threaded opening and of sufficient length to extend into the bore for securing the second conductor to the stud.

9. The system of claim 8 wherein the second electrical conductor is a telephone system grounding wire.

10. A system for grounding a telephone system and an electrical power system, comprising:
    an electric utility box for the electrical power system;
    a ground mechanism;
    a first electrical conductor connecting the ground mechanism to the utility box for electrically grounding the utility box;
    receiving means comprising a member or an outer surface of the utility box for receiving a second electrical conductor to form a mechanical and electrical connection between the second conductor and the box;
    a second electrical conductor connected between the receiving means and a ground connection for a component of the telephone system, whereby the ground mechanism serves the dual purpose of grounding the telephone system and the utility box.

11. The system of claim 10 wherein the receiving means comprises a stud fixably attached to an outer surface of the utility box.

12. The system of claim 11 wherein the stud includes a bore formed therein for receiving a conductor, a threaded opening in the stud extending to the bore, and a securing screw moveable within the threaded opening for securing the conductor in the bore.

13. The system of claim 10 wherein the receiving means is secured to the utility box without penetrating the inside of the box.

14. The system of claim 10 further comprising a bracket secured to the utility box onto which a component of the telephone system is mechanically mounted.

15. The system of claim 14 wherein the bracket is welded to the outer surface of the utility box.

16. The system of claim 15 wherein said bracket is made from an electrically conductive material.

17. The system of claim 14 further comprising a plate mounted to the bracket, with a telephone system component mounted to the plate.

18. A system for mounting a telephone interface box to a grounded utility box, comprising:
   a bracket having a foot member attached to an outer surface of the utility box, a leg member connected to said foot member and directed away from said outer surface, and a platform member spaced away from said outer surface and connected to said leg member;
   a separable plate for mounting the telephone box thereon; and
   means for attaching said plate to said platform member, said means extending towards said outer surface without penetrating said surface.

19. The system of claim 18 wherein said spaced away platform member is generally parallel to said outer surface of the box.

20. The system of claim 19 wherein said bracket includes a pair of leg members connected to opposite ends of said platform member and a foot member connected to each said leg member.

21. The system of claim 20 wherein said foot members are welded to the outer surface of the box.

22. The system of claim 21 wherein said bracket and said plate are made from an electrically conductive material.

23. The system of claim 22 which further includes a ground wire for attaching to a ground terminal of a telephone system component and receiving means fixably attached to the utility box for receiving the ground wire.

* * * * *